(12) United States Patent
Kildegaard

(10) Patent No.: US 7,377,844 B2
(45) Date of Patent: May 27, 2008

(54) METHOD AND APPARATUS FOR STUNNING OF SLAUGHTER ANIMALS

(75) Inventor: Jacob L. Kildegaard, Hellerup (DK)

(73) Assignee: Butina APS, Holbaek (DK)

( * ) Notice: Subject to any disclaimer, the term of this patent is extended or adjusted under 35 U.S.C. 154(b) by 473 days.

(21) Appl. No.: 10/542,190

(22) PCT Filed: Jan. 15, 2004

(86) PCT No.: PCT/DK2004/000018

§ 371 (c)(1),
(2), (4) Date: Sep. 12, 2005

(87) PCT Pub. No.: WO2004/064527

PCT Pub. Date: Aug. 5, 2004

(65) Prior Publication Data

US 2006/0154585 A1    Jul. 13, 2006

(30) Foreign Application Priority Data

Jan. 17, 2003    (DK) ............................... 2003 00039

(51) Int. Cl.
*A22B 3/00* (2006.01)
(52) U.S. Cl. .................................................... 452/66
(58) Field of Classification Search ............... None
See application file for complete search history.

(56) References Cited

FOREIGN PATENT DOCUMENTS

EP    0 441 633 A2    8/1991
EP    1 405 564 A1    4/2004
WO    WO 02/076219 A2    10/2002

OTHER PUBLICATIONS

International Prelimanary Examination Report for PCT/DK2004/000018, Jul. 22, 2005.
Written Opinion of the International Searching Authority for PCT/DK2004/000018, Apr. 4, 2004.
International Search Report for PCT/DK04/00018.
Written Opinion of the ISA for PCT/DK04/00018.

*Primary Examiner*—Thomas Price
(74) *Attorney, Agent, or Firm*—Marshall, Gerstein & Borun LLP

(57) ABSTRACT

In stunning of slaughter animals by means of a box stunning apparatus with stunning atmosphere, boxes (1, 1a, 1b, 1c, 1d) are conveyed around after one another to various stop positions by means of a transport system (11, 12). Animals to be stunned are driven forwards in a driveway (2) and into an entrance area (3). The animals in the entrance area are separated from other animals after a group of animals has passed into the area. The group is driven into an empty box (1) that is brought to a halt in the first stop position at the entrance area. The box is then conveyed into the stunning atmosphere. After the animals have been in the atmosphere the box is conveyed out of the atmosphere and is brought to a stop at an emptying area (13) to empty the box of stunning animals.

23 Claims, 2 Drawing Sheets

METHOD AND APPARATUS FOR STUNNING OF SLAUGHTER ANIMALS

REFERENCE TO RELATED APPLICATIONS

This application is the U.S. national stage, under 35 U.S.C. 0 371, of International Application No. PCT/DK04/00018, having an international filing date of Jan. 15, 2004, and claims priority to Danish patent application PA 200300039, filed Jan. 17, 2003.

BACKGROUND

1. Field of the Invention

The present invention relates to a method and an apparatus for stunning of slaughter animals.

2. Description of the Prior Art

In stunning of slaughter pigs some slaughterhouses use a box stunning apparatus with $CO_2$ atmosphere, e.g. an apparatus of the "Backloader" type from Butina ApS, Denmark. Animals are driven along a driveway towards an entrance area, and when a number of animals corresponding to the box size has entered the area it is closed towards the driveway to prevent other animals entering the area. The group of animals in the area is then driven into a box, which is placed in a receiving position at the entrance area. The box is closed and lowered into a pit with $CO_2$. After the animals have been in the $CO_2$ atmosphere for some time they have been stunned and the box is lifted out of the pit to an emptying area opposite the entrance area. The animals are discharged from the box, and shackled for sticking and bleeding.

In box stunning apparatuses of this type movement of a box depends on the movement of the other boxes, because the boxes are conveyed close after one another in a closed path. This means that the movement of the boxes must be stopped each time a box is being filled.

The ability of the apparatus to supply the slaughter line with stunned animals depends to a great extent on the time it takes for a group of animals to pass into the entrance area, the time it takes to separate the group of animals from the animals in the driveway, and the time it takes to drive the group into a box. The time spent on these work phases varies considerably because of the behaviour of the animals. Some animals walk in of their own volition, or are easy to drive in, while others are unwilling or hesitate, so that the process is delayed. To compensate for this, box stunning apparatuses are designed with excess capacity so that the required number of stunned animals can be provided on the emptying side even when process time on the entrance side is prolonged. However, the result of this is that too many animals are supplied to the slaughter line when the process on the entrance side is smooth, or if the operator puts pressure on the animals to gain time in connection with work breaks. The result is a build-up of animals on the emptying side, which means that the operators there and on the rest of the slaughter line cannot manage to process the stunned animals at the speed at which they arrive.

SUMMARY

The object of the invention is to provide a stunning method and a stunning apparatus in which the operations can be made more resistant to the above-mentioned variations, with a view to preventing a build-up of stunned animals on the emptying side and in which an improved economy of operations can also be obtained.

The method of the invention is of the type in which slaughter animals are stunned in a stunning atmosphere in a stunning apparatus with boxes that are conveyed around after one another to various stop positions by means of a transport system, wherein animals are driven forwards in a driveway and into an entrance area, the animals in the entrance area are separated from other animals after a group of animals has passed into the area, and the group is driven into an empty box that is brought to a halt in a first stop position at the entrance area, and wherein the box is then conveyed into the stunning atmosphere, and the box after the animals have been in the atmosphere is conveyed out of the atmosphere and is brought to a stop at an emptying area to empty the box of stunned animals.

The method of the invention is characterised in that it comprises the steps of:

measuring a time period comprising a separation time that elapses from a first state, at which the animals pass or are allowed to pass into the entrance area, and to a second state occurring during the period from the time when a group of animals has passed into the entrance area to the time when the group has been driven into the box or the filled box is ready for transport, calculation of a desired box transport time to a third state, at which the filled box has been lowered into the atmosphere and a certain event occurs, which calculation is performed on the basis of the time period measured, and controlling the transport system with a view to obtaining the desired box transport time to the third state.

The method of the invention comprises measurement of the time period spend at the entrance side, which period includes the variation in time due to the operator and/or the behaviour of the animals. The time period measured is then used to calculate a time for the work phase during which the box is introduced into the stunning atmosphere to a position in the atmosphere with a view to counteract the variation in time on the entrance side. The transport system is then controlled in accordance with the calculation to obtain the calculated time of the work phase.

In this way build-up of stunned animals on the emptying side is avoided, because the time measurement makes it possible to calculate how to obtain more suitable operations of the work phase, which is implemented by controlling the transport system. The effect of short times on the entrance side can be reduced considerably, whether the reason is unproblematic behaviour of the animals or the fact that the operator is putting pressure on the animals. The method can be performed without any action from the operator except that he activates a start button or similar device when a group of animals is in position in the entrance area, and operations of the stunning apparatus are not affected even if the operator puts pressure on the animals because the system counteracts for this automatically. The present method makes it possible to reduce the effect of long time periods on the entrance side considerably, by expediting box transport in the atmosphere.

Another advantage of the present method is that the animals spend nearly the same amount of time in the stunning atmosphere. This ensures that the animals get a full anaesthetization, and it will be possible to reduce the content of stunning gas in the atmosphere to some extent without affecting the anaesthetization. As the box speed in the atmosphere can also be reduced when time allows, an additional saving in stunning gas can be obtained compared with the current practice, which employs a fixed, high, constant speed.

The method of the invention can be used in apparatuses in which the behaviour of the animals on the entrance side during their passage into the entrance area, the division into a group of animals and driving of the animals into the box would otherwise result in variable operating time for the apparatus.

The method of the invention can be used in apparatuses in which box transport to the first stop position at the entrance area does not overlap in time with the passage of the animals into the entrance area and the process of separation. The method of the invention can also be used in apparatuses in which there is an overlap in time between box transport to the first stop position and the processes mentioned on the entrance side. So it can be used in apparatuses in which the box is transported to the first stop position while the animals are passing into the entrance area, e.g. in apparatuses of the "Backloader" type.

The "time period measured" can mean the time from the moment the animals are allowed to walk into the entrance area and until the box is closed or becomes ready for transport, particularly in apparatuses in which the box is in receiving position when the animals start to pass into the area. The "time period measured" can also mean the time from the moment a box is brought to a halt in the first stop position during the animals' passage into the entrance area and until the box is closed or becomes ready for transport, particularly in apparatuses in which the box is transported to the first stop position while the animals are entering the entrance area.

The time period measured can comprise the time it takes to drive the animals into a box when this part of the process is not fixed in terms of time but depends on the behaviour of the animals, or when this part of the process varies owing to an emergency procedure during automatic driving into a box.

The animals can be allowed to pass into the box while they are passing into the entrance area or the passage into the area and the driving into the box can be carried out successively, and the driving can be performed in accordance with a fixed timetable, or can depend on the varying behaviour of the animals.

Obviously, the time period measured can comprise other processes, e.g. brief adjacent processes such as the opening/closing of gates. It can also comprise an adjacent, lengthy process, e.g. driving animals into the box in accordance with a fixed timetable. However, the time period measured need not include processes that last a fixed length of time. When such processes are included in measurement, the calculation should be performed with due regard to/compensation for these times.

So the time period measured can comprise both a variable part (i.e. the separation time in particular) and a fixed part (e.g. the time taken by driving into the box and opening/closing of gates), but need not comprise any fixed part.

The time period measured can extend to the moment at which the group of animals has entered the entrance area, the area has been closed or the animals have been driven into the box, and must end at latest when the box is ready to be set in motion according to the time period calculated.

The "time period calculated" can mean the time that elapses between a group of animals has passed into the entrance area, the area being closed, the group being driven into the box, the box being closed, or a filled box being ready for transport, and until the box has been transported into the atmosphere and a certain event occurs (e.g. the box reaches a specific position in the atmosphere in the pit).

If the transport system is a paternoster system or a similar fixed system, the event may e.g. occur at the moment the box is brought to a halt because the next box is brought to a halt at the entrance area to receive animals.

If the transport system is of a type with boxes, which move more independently of each other, the third state does not need to include a stop position that is determined by the the next box being filled, but can simply involve the box reaching a specific position, e.g. when the next box reaches receiver position. Transport systems like this can for instance comprise a lift at each end of the pit/chamber containing the stunning atmosphere, a horizontal conveyor at the bottom of the pit/chamber, and another conveyor above it to return the box after it has been emptied.

The time period calculated can comprise a variable part, but if desired it can also comprise phases that are fixed in time and that are included in the control program and the calculation.

Preferably the time period calculated comes after the time period measured, e.g. immediately after the time period measured.

The method of the invention can thus be carried out in many different ways. What they all have in common is that measurement is performed of a time period that varies from one box to another owing to the varying behaviour of the animals and/or the operator, and that the measurement is reflected in operations in a corresponding (but opposite directed) time variation of the phase during which the box is transported into the stunning atmosphere. This phase should preferably be completed before the next box is ready for transport into the atmosphere from the stop position at the entrance area.

Preferred embodiments of the method of the invention are stated in claims 2-16.

The first state can involve allowing access to the entrance area, animals starting to pass into the area, or a specific event occurring between these states.

The first state can be the box being brought to a halt in the first stop position during the animals' passage into the entrance area.

Part of the transport of the box towards the first stop position and the passage of animals into the entrance area can be performed simultaneously, and the first state can occur at the end of the common period.

The second state can be the separation of a group of animals from other animals, the commencement of driving the group into a box, or a signal that the filled box is ready for lowering into the atmosphere.

The time period calculated can follow the time period measured.

The third state can be that after lowering the box into the atmosphere it is brought to a halt in the atmosphere in a second stop position, such as when the box is brought to a halt in a second stop position when the next box is brought to a halt at the entrance area, or shortly before/after this moment.

A ready signal that a group of animals has entered the entrance area can lead to separation by closure of the entrance to the area. The signal can be released manually or automatically, e.g. by means of a video system that monitors the number of animals in the entrance area.

The length of the time period calculated can be inversely dependable on the length of the time period measured, so that a relatively long, measured time period gives a relatively short, calculated time period, and a relatively short, measured time period gives a relatively long, calculated time period. One way of achieving this is to make the calculated time period inversely proportional to the time period measured.

A preferred embodiment involves performing the calculation on the basis of the time period measured and with a view to achieving a mainly constant sequential time, which is the time from the first to the third state. The sequential time can e.g. be between 30 and 100 seconds.

The time period calculated can include a delay period before the box starts from the first stop position. In this way it is possible to compensate when only a short time is used for the passage and separation of a group of animals (the separation time).

The time period calculated can be implemented by controlling the transport speed of the box and adding a possible delay period before the box starts from the first stop position. This saves on stunning gas when the separation time is short, as well as makes it possible to maintain capacity in connection with most long separation times.

The transport speed of the box can be adjusted between a preset maximum value and a preset minimum value. This prevents the unnecessary waste of stunning gas when the separation time is long, and ensures a stable transport of the boxes.

The time period calculated can include a delay period before the box starts from the first stop position if the time period calculated for the transport of the box to the third state at minimum speed is insufficient to implement the time period calculated.

The box can be transported at maximum speed if the time period calculated for transporting the box to the third state requires a speed in excess of the maximum speed. This prevents the unnecessary waste of stunning gas.

The time period calculated can also be adjusted based on the time period measured for the previous box if it has been transported at maximum speed. This ensures that full capacity can be maintained, and makes it possible to reduce the maximum speed to save on stunning gas.

The apparatus according to the invention is of the type that comprises a driveway to drive animals forwards and into an entrance area with means for separating a group of animals that has passed into the area from other animals, boxes for the animals, and a transport system to move the boxes around after one another to various stop positions, with the first stop position at the entrance area to drive the animals into the box, wherein the transport system after filling of a box in the first stop position conveys it into the stunning atmosphere, and after the animals have been in the atmosphere moves the box out of the atmosphere and brings it to a halt at an emptying area to empty the box of stunned animals.

The apparatus according to the invention is characterised in that it comprises:
- a measuring arrangement to measure a time period comprising a separation time that elapses from a first state, at which the animals pass or are allowed to pass into the entrance area, and to a second state occurring during the period from the time when a group of animals has passed into the entrance area to the time when the group has been driven into the box or the filled box is ready for transport,
- a calculation unit to calculate a desired box transport time to a third state, at which the filled box has been lowered into the atmosphere and a certain event occurs, which calculation is performed on the basis of the time period measured, and
- a control device for the transport system to obtain the desired box transport time to the third state.

Advantageous embodiments of the apparatus of the invention are stated in claims 18-23.

The measuring arrangement can be designed to measure the time period that elapses between the box being brought to a halt in the first stop position at the entrance area or the entrance area being opened to receive animals and until a group of animals in the entrance area is separated from other animals, the group is driven into the box, or the filled box is ready for lowering into the atmosphere.

A ready signal that a group of animals has entered the entrance area can lead to separation by the entrance area being closed.

The time period calculated can be the time period that elapses between the filled box being closed or being ready for lowering into the atmosphere, and until the box after transport is brought to a halt in the atmosphere in a second stop position, caused for instance by the next box being brought to a halt at the entrance area.

The calculation unit can comprise a calculation model which is so designed that the length of the time period calculated is inversely dependable on the length of the time period measured, so that a relatively long, measured time period gives a relatively short, calculated time period, and a relatively short, measured time period gives to a relatively long, calculated time period.

In particular, it is preferable that the calculation unit comprises a calculation model that is so designed that the calculation is performed on the basis of the time period measured and with a view to achieving a mainly constant sequential time, which is the time from the first to the third state.

The motor for transport of the boxes by means of the transport system can have a speed regulation, which is controlled by means of the calculated value.

The method and apparatus according to the invention can be used in stunning of slaughter pigs and other large animals, e.g. cattle, sheep etc.

The invention is explained in further detail in the following with references to the drawings, in which

DETAILED DESCRIPTION OF THE PREFERRED EMBODIMENTS

Figure 1:
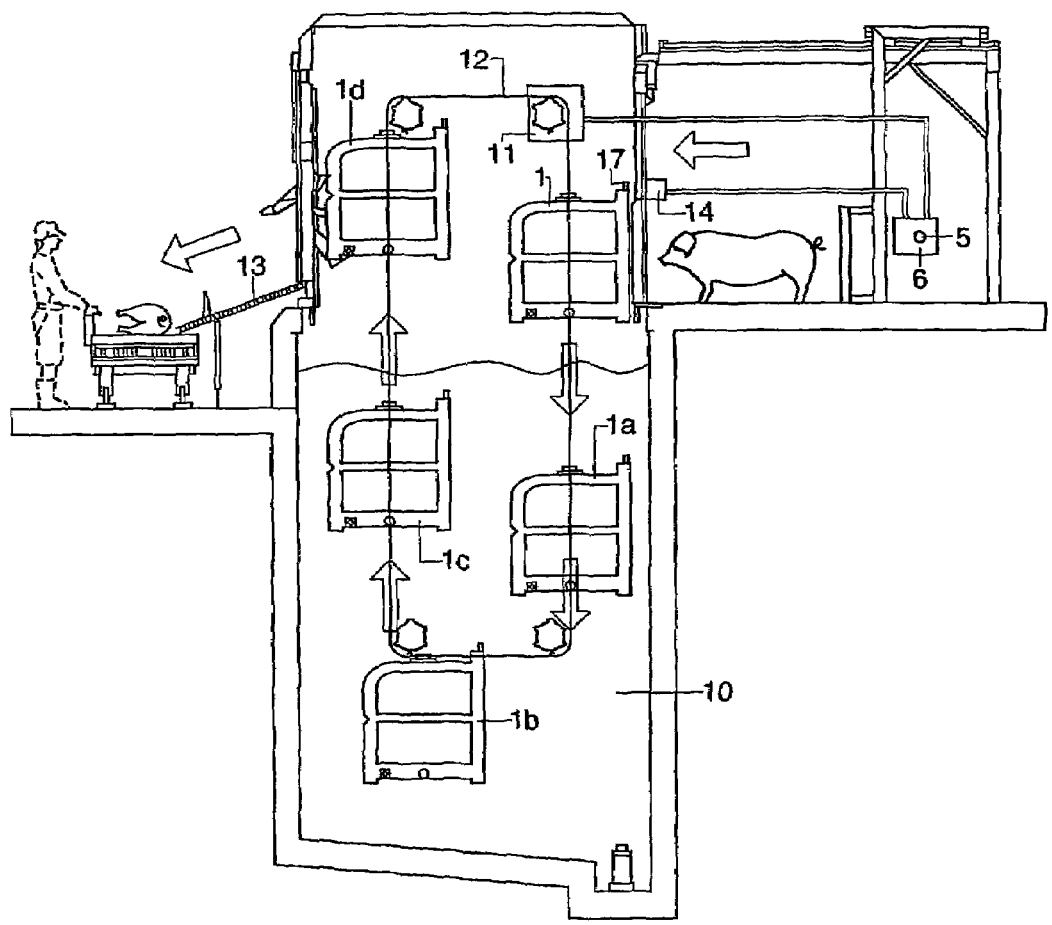
FIG. 1 shows a cross section of a stunning apparatus according to the invention seen from the side.
Figure 2:
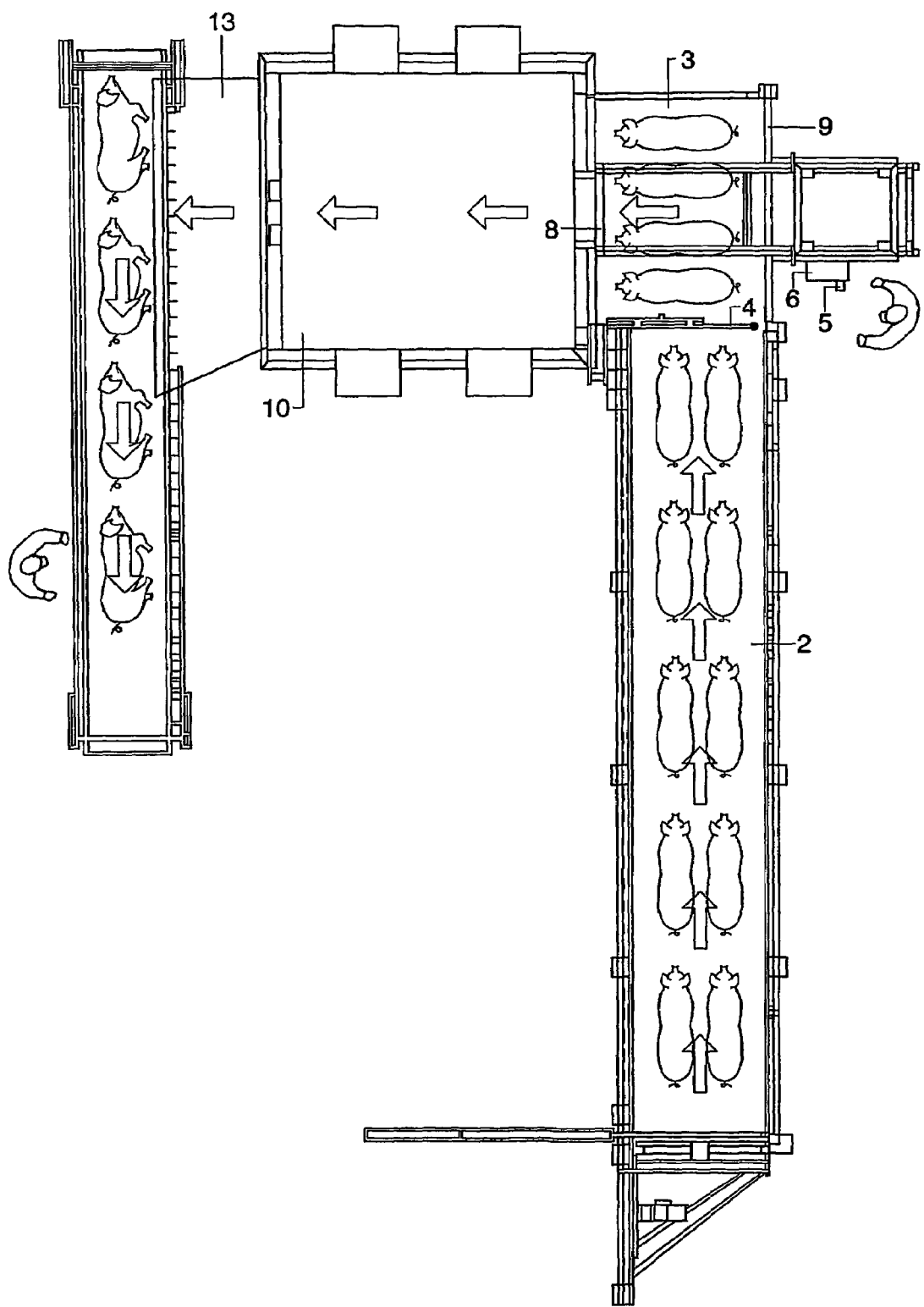
FIG. 2 shows the apparatus seen from above.

The apparatus in FIGS. 1 and 2 is of the "Backloader" type from Butina ApS, Denmark. It comprises five stun boxes (1, 1a, 1b, 1c and 1d), each designed to contain a group of animals, e.g. a group of five animals (other group sizes of 2-10 animals and other box numbers of 3-15 boxes are also possible). The animals are driven from the pen area of the slaughterhouse into a driveway 2 (FIG. 2), which ends in an entrance area 3 for group wise separation of the animals and driving of animals into an empty stun box 1. At the entrance to the entrance area 3 there is a sliding gate 4, which can be placed in a partially open position during the animals' passage in the driveway and into the entrance area to allow only one animal at a time to enter the area. The partially open position of the sliding gate makes it possible to drive the animals into the area more calmly, and reduces the risk of an animal getting stuck when the gate is closed. (The opening of sliding gate 4 can constitute the first state in the method of the invention, at which measurement of time commences).

An operator watches that the animals enter the entrance area, and activates a button 5 when a group of animals of the desired size (5±1) has passed into the area. This closes gate 4 automatically. (Actuation of the button can constitute the second state in the method of the invention, at which measurement of time is ended).

When the button is pushed, a series of automatic procedures and sequences starts, controlled by a PLC unit. An entrance gate 7 is opened into an empty box, which the transport system has placed at the entrance area, and at the same time an elevating gate 8 in the corresponding sidewall of the entrance area is lifted to allow free passage for the animals from area 3 into box 1. After a short pause a sliding wall 9 in the entrance area is moved towards the box so that the animals are slowly driven into it. When the sliding wall 9 has reached the opposite side, the entrance gate 7 of the box is closed and the elevating gate 8 is lowered again once the sliding wall 9 has been returned a little. The sliding wall 9 returns fully to its initial position, and once this has occurred the sliding gate 4 at the entrance to the area can be opened again so animals can pass into the area again. The automatic processes from closing of the gate 4 and to the gate is opened again take place according to a preset, fixed timetable. If problems of animals getting stuck or similar problems arise, an emergency procedure is started to remedy the problems.

In a similar second embodiment a box is placed in position at the entrance area while the animals pass into this, and the box is opened so the animals can continue and walk into it. (In this embodiment the positioning or opening of the box can constitute the first state in the method of the invention, at which time measurement starts, while activation of the button to close gate 4 constitutes the second state, at which time measurement is ended.) The rest of the process is the same as in the first embodiment.

As soon as the entrance gate 7 of the box has been closed after the animals in the above-mentioned processes, box 1 can be lowered into the pit with $CO_2$ atmosphere by starting motor 11 of the transport system, so that the five boxes 1, 1a, 1b, 1c, 1d are set in motion by means of the transport system's chain suspension 12 for the boxes. When the filled box 1 is in position by box 1a the motor stops again because the next empty box has come to receiving position at entrance area 3, while box number 3 in front containing fully stunned animals is located at the emptying area 13, where the box is emptied of animals for shackling and sticking. (Stopping can constitute the third state in the method according to the invention, i.e. the end of box transport time.) This is the end of the processes of the method of the invention. But the apparatus continues with new animals: when the said next box at the entrance area has been filled in the same way as described above, the transport system can set the boxes in motion again, so the box in the position shown for box 1a is transported to the position shown for box 1b. At this point the motor stops again so another empty box can be filled after being positioned at the entrance area 3. The process then continues so the box in position shown for box 1b arrives in the position shown for box 1c and then continues to the position shown for box 1d so the fully stunned animals can be discharged to the emptying area. When the box has been transported from the position shown for box 1d to the position at the entrance area 3, it can again receive animals to be stunned.

In the apparatuses used today, the time schedule of the above-mentioned procedures and sequences is fixed, so the only variables are the time it takes for animals to pass into the entrance area 3 and the time it takes to separate the animals into a group distinct from the other animals (which occurs when the operator activates the button 5 to close the sliding gate to the area).

The present apparatus differs from apparatuses currently used in that it comprises a time measuring system, a calculation unit to process the measured time, and a control unit to control the box transport system in accordance with the processed time. The apparatus is equipped with a specially designed control unit 6 with a computer and a program with a calculation model. The apparatus also has a detector that emits a signal to the control unit the moment an empty box 1 is in position to receive animals from the entrance area 3. In FIG. 1 the detector is shown as an external component 14, but it can also simply be part of the control program of control unit 6. Unit 6 also contains a time-measuring system/program to measure the time that elapses from the moment the detector 14 emits a signal (occurrence of the first state in the second embodiment) and to the operator actuates the button 5 on the unit (occurrence of the second state) to show that the entrance area contains the desired number of animals so that the sliding gate 4 can be closed, or from the detector emits a signal and to the animals have been driven into the box or the box is ready for transport. The measured time is entered automatically in unit 6's calculation program, and the computer calculates how the subsequent transport phase for box 1 should be performed with regard to time (until the third state) in order to counteract long or short separation times and any time spent on emergency procedures in connection with the process of driving the animals into the box. The apparatus comprises a speed regulator for the motor 11 for the transport process, which regulator is controlled by the control unit. By means of the calculated result and suitable control mechanisms, the motor is activated to perform the transport phase in accordance with the calculation, e.g. using a calculated transport speed. This combination of design elements, measurements, calculations and control processes makes it possible to achieve a more optimum stunning process and operation of the apparatus compared to apparatuses currently used, which employ fixed time intervals and box transport time. Operations are more stable, and $CO_2$ consumption is reduced.

The examples below illustrate the operation of an apparatus of the invention with the following configuration:

No. of boxes: 5

No. of animals per box: 5 (average)

Stunning capacity at 150 seconds in $CO_2$ atmosphere: 360 animals/hour

Sequential time: 50 seconds

The sequential time is the sum of separation time, time of driving into box and box transport time. With this configuration the sequential time is:

(seconds available×no. of animals per box)/capacity= (3600×5)/360=50 seconds

Separation time: variable, depending on animal behaviour etc.

(The separation time in this example is the time that elapses from the moment the box is stopped in the first stop position (the first state) and to the animals have finished entering the entrance area and the sliding gate has been closed when the operator actuates button 5 (the second state). It varies considerably, and is normally between 6 and 12 seconds—although faster and slower times also occur. This is the factor that makes stable operation of box stunning apparatuses difficult.)

Time of driving into box: 17.5 seconds during normal operation (Driving the animals from the entrance area into the box includes the following fixed-time processes: lifting the entrance gate and elevating gate, bringing in the sliding wall, lowering the entrance gate, withdrawing the sliding wall slightly, and lowering the elevating gate.)

Time taken for box transport to second stop position (the third state): variable, calculated depending on the separation time (and any extra time spent on emergency procedures during driving into box), adjusted by setting the box speed to between 0.10 and 0.20 m/sec. and perhaps by using a start time delay (example 1) or by using a fixed speed of 0.134 m/sec. together with a start time delay (example 2).

(A high box speed means that $CO_2$ is lost from the pit, which affects the operating costs. A transport speed that is too low means that the capacity is reduced or that the transport system risks coming to a stop. In example 1 a maximum and minimum box transport speed of 0.20 and 0.10 m/sec. respectively have been chosen, including acceleration and braking. In example 2 a fixed speed of 0.134 m/sec. is used.)

EXAMPLE 1

With an assumed separation time of 2, 6, 12 and 20 seconds respectively, the following transport conditions for the boxes can be calculated from the moment a group of animals has been driven into the box and to the box reaches the first stop position in the pit:

| Case no. | Transport time* sec. | Cal. speed m/sec. | Adjusted speed m/sec. | Start delay sec. |
|---|---|---|---|---|
| 1 | 30.5 | 0.090 | 0.100 | 3 |
| 2 | 26.5 | 0.104 | unchanged | none |
| 3 | 20.5 | 0.134 | unchanged | none |
| 4 | 12.5 | 0.220 | 0.200 | (−1) |

*transport time = sequential time − separation time − time for driving into box

Case 1: Here it has taken only 2 seconds between the box being in first stop position and the animals finishing their entrance into the entrance area. So the apparatus has plenty of time to transport the box to stop position in the pit—so much time that the minimum speed cannot be reached. So the box speed is increased to the minimum speed at which the system can operate, and a pause of standstill is introduced before box transport is commenced.

Cases 2 and 3: Here the animals have used 6 and 12 seconds respectively to complete the process of passing into the entrance area. The calculated box speeds are within the system's maximum and minimum limits, so the box transport starts immediately after the entrance gate has descended, and it is carried out at the calculated speeds.

Case 4: Here it has taken a very long time to get all the animals into the entrance area, e.g. due to restlessness in the flock standing in the driveway. This means that there is little time to complete the rest of the sequence. The calculated box speed is above the maximum speed of the system, so the actual speed must be reduced to the maximum speed.

To recover the lost time, a slightly shorter sequential time can be used for the next box, increasing the speed of this box in relation to the calculated speed.

EXAMPLE 2

In this example speed regulation is not used, but only start/stop control of the motor and an addition of a start delay whenever necessary. On the other hand, a higher transport speed is used for the boxes, e.g. corresponding to the calculated speed in example 1, case 3.

| Case no. | Transport time sec. | Cal. speed m/sec. | Used speed m/sec. | Start delay sec. |
|---|---|---|---|---|
| 1 | 30.5 | 0.090 | 0.134 | 10 |
| 2 | 26.5 | 0.104 | 0.134 | 6 |
| 3 | 20.5 | 0.134 | 0.134 | none |
| 4 | 12.5 | 0.220 | 0.134 | (−8) |

When case 4 occurs, there will be a loss of capacity, which can be compensated for by reducing the start delay for the next boxes.

I claim:

1. Method for stunning of slaughter animals in a stunning atmosphere in a stunning apparatus with boxes (1, 1a, 1b, 1c, 1d) that are conveyed around after one another to various stop positions by means of a transport system (11,12), wherein animals are driven forwards in a driveway (2) and into an entrance area (3), the animals in the entrance area are separated from other animals after a group of animals has passed into the area, and the group is driven into an empty box (1) that is brought to a halt in a first stop position at the entrance area, and wherein the box is then conveyed into the stunning atmosphere, and the box after the animals have been in the atmosphere is conveyed out of the atmosphere and is brought to a stop at an emptying area (13) to empty the box of stunned animals, comprising:

measuring a time period comprising a separation time that elapses from a first state, at which the animals pass or are allowed to pass into the entrance area (3), and to a second state occurring during the period from a time when a group of animals has passed into the entrance area to a time when the group has been driven into the box or the filled box is ready for transport;

calculation of a desired box transport time to a third state, at which the filled box has been lowered into the atmosphere and a certain event occurs, which calculation is performed on the basis of the time period measured; and controlling the transport system to obtain the desired box transport time to the third state.

2. Method according to claim 1, wherein the first state involves one of allowing access to the entrance area (3), the animals starting to pass into the area (3), or a specific event occurring between these states.

3. Method according to claim 1, wherein in the first state, the box (1) is brought to a halt in the first stop position during the animals's passage into the entrance area.

4. Method according to claim 1, wherein in part of the transport of the box towards the first stop position and the passage of animals into the entrance area is performed simultaneously, and the first state occurs at the end of the common period.

5. Method according to claim 1, wherein in the second state a group of animals is separated from other animals, the driving the group into a box is commenced, or a signal is provided indicating that the filled box is ready for lowering into the atmosphere.

6. Method according to claim 1, wherein the time period calculated follows the time period measured.

7. Method according to claim 1, wherein in the third state, after lowering the box into the atmosphere the box is brought to a halt in the atmosphere in a second stop position.

8. Method according to claim 1, wherein a ready signal is provided indicating that a group of animals has entered the entrance area lead to separation by closure of the entrance to the area.

9. Method according to claim 1, wherein the length of the time period calculated depends inversely on the length of the time period measured, so that a relatively long, measured time period gives a relatively short, calculated time period, and a relatively short, measured time period gives a relatively long, calculated time period.

10. Method according to claim 1, wherein the calculation is performed on the basis of the time period measured and in order to achieve a substantially constant sequential time, which is the time from the first to the third state.

11. Method according to claim 1, wherein the time period calculated includes a delay period before the box starts from the first stop position.

12. Method according to claim 1, wherein the time period calculated is implemented by controlling the transport speed of the box and adding a possible delay period before the box starts from the first stop position.

13. Method according to claim 12, wherein the transport speed of the box is adjusted between a maximum value and a minimum value.

14. Method according to claim 12, wherein the time period calculated includes a delay period before the box starts from the first stop position if the time period calculated for the transport of the box to the third state at a minimum speed is insufficient to implement the time period calculated.

15. Method according to claim 12, wherein the box is transported at a maximum speed if the time period calculated for transporting the box to the third state requires a speed in excess of the maximum speed.

16. Method according to claim 12, wherein the time period calculated is also adjusted based on the time period measured for the previous box if it has been transported at a maximum speed.

17. Apparatus for stunning of slaughter animals in a stunning apparatus comprising: a driveway (2) to drive animals forwards and into an entrance area (3) with means for separating a group of animals that has passed into the area from other animals, boxes (1, 1a, 1b, 1c, 1d) for the animals, and a transport system (11,12) to move the boxes around after one another to various stop positions, with the first stop position at the entrance area (3) to drive the animals into the box, wherein the transport system after filling of a box in the first stop position conveys the box into a stunning atmosphere, and after the animals have been in the atmosphere, moves the box out of the atmosphere and brings the box to a halt at an emptying area (13) to empty the box of stunned animals;

a measuring arrangement (5,14) to measure a time period comprising a separation time that elapses from a first state, at which the animals pass or are allowed to pass into the entrance area (3), and to a second state occurring during the period from the time when a group of animals has passed into the entrance area (3) to the time when the group has been driven into the box or the filled box is ready for transport, a calculation unit (6) to calculate a desired box transport time to a third state, at which the filled box has been lowered into the atmosphere and a certain event occurs, which calculation is performed on the basis of the time period measured; and a control device for the transport system to obtain the desired box transport time to the third state.

18. Apparatus according to claim 17, wherein the measuring arrangement is designed to measure the time period that elapses between the box being brought to a halt in the first stop position at the entrance area or the entrance area being opened to receive animals and until a group of animals in the entrance area is separated from other animals, the group is driven into the box, or the filled box is ready for lowering into the atmosphere.

19. Apparatus according to claim 17, wherein a ready signal is provided to indicate that a group of animals has entered the entrance areas, upon which the entrance area closed for separation.

20. Apparatus according to claim 17, wherein the time period calculated is the time period that elapses between one of the filled box being closed or being ready for lowering into the atmosphere, and until the box after transport is brought to a halt in the atmosphere in a second stop position.

21. Apparatus according to claim 17, wherein the calculation unit comprises a calculation model which is so designed that the length of the time period calculated depends inversely on the length of the time period measured, so that a relatively long, measured time period gives a relatively short, calculated time period, and a relatively short, measured time period gives to a relatively long, calculated time period.

22. Apparatus according to claim 17, wherein the calculation unit comprises a calculation model that is so designed that the calculation is performed on the basis of the time period measured so as to achieve a substantially constant sequential time, which is the time from the first to the third state.

23. Apparatus according to claim 17, wherein the motor for transport of the boxes by means of the transport system has a speed regulation, which is controlled by the calculated value.

\* \* \* \* \*

UNITED STATES PATENT AND TRADEMARK OFFICE
CERTIFICATE OF CORRECTION

PATENT NO. : 7,377,844 B2 Page 1 of 1
APPLICATION NO. : 10/542190
DATED : May 27, 2008
INVENTOR(S) : Jacob L. Kildegaard It is certified that error appears in the above-identified patent and that said Letters Patent is hereby corrected as shown below:

In the Claims:

At Column 10, line 57, "animals's" should be -- animals' --.

At Column 12, line 28, "areas," should be -- area, --.

Signed and Sealed this

Thirtieth Day of September, 2008

JON W. DUDAS
*Director of the United States Patent and Trademark Office*